United States Patent [19]

Ando et al.

[11] 4,403,231

[45] Sep. 6, 1983

[54] DATA RECORDING MEDIUM

[75] Inventors: Hideo Ando, Hino; Toshiharu Nakagawa, Yokohama, both of Japan

[73] Assignee: Tokyo Shibaura Denki Kabushiki Kaisha, Kawasaki, Japan

[21] Appl. No.: 343,983

[22] Filed: Jan. 29, 1982

[30] Foreign Application Priority Data

Feb. 5, 1981 [JP] Japan ................................. 56-14979

[51] Int. Cl.³ .......................................... G01D 15/34
[52] U.S. Cl. ................................................ 346/135.1
[58] Field of Search ....................... 346/1.1, 76, 135.1

[56] References Cited

U.S. PATENT DOCUMENTS

| | | | |
|---|---|---|---|
| 3,560,994 | 2/1971 | Wolff et al. | 346/76 L X |
| 3,657,721 | 4/1972 | Traub et al. | 346/135.1 |
| 3,665,483 | 5/1972 | Becker et al. | 346/1.1 |
| 3,996,057 | 12/1976 | Kawaziri et al. | 96/484 D |
| 4,069,487 | 1/1978 | Kasai et al. | 346/76 L |
| 4,188,214 | 2/1980 | Kido et al. | 346/76 L X |

FOREIGN PATENT DOCUMENTS

| | | |
|---|---|---|
| 2522928 | 12/1975 | Fed. Rep. of Germany . |
| 48-68251 | 9/1973 | Japan . |
| 7804656 | 3/1979 | Netherlands ..................... 346/76 L |

*Primary Examiner*—Donald A. Griffin
*Attorney, Agent, or Firm*—Cushman, Darby & Cushman

[57] ABSTRACT

The invention provides a data recording medium comprising: a disc-shaped substrate; a radiation-sensitive recording layer formed on one surface of the substrate; an oxide layer formed by oxidizing a surface of the said recording layer; and a protective layer formed on the oxide layer. The data recording medium of the invention prevents formation of cracks in the recording layer and/or protective layer and is improved in the manufacturing yield.

5 Claims, 4 Drawing Figures

DATA RECORDING MEDIUM

BACKGROUND OF THE INVENTION

The present invention relates to a data recording medium. The data recording medium has a radiation-sensitive recording layer. A laser beam is focused on the radiation-sensitive recording layer to form a pit therein, thereby recording optical data. The optical data recorded in this manner can be read out.

A conventional data recording medium is known wherein a recording layer 2 of a metal such as Te, Bi, Mn or the like is formed on a substrate 1 of glass or a synthetic resin by vacuum deposition, sputtering or the like (FIG. 1). Another conventional data recording medium is known wherein an anticorrosive protective layer 3 is formed on the surface of the recording layer 2 (FIG. 2). The protective layer 3 is generally made of an organic or inorganic material which has resistance to corrosion. The protective layer of an inorganic material is formed on the recording layer into a thin film of less than 5,000 Å in thickness, for example, by vacuum deposition, sputtering or the like of silicon dioxide, silicon monoxide, indium oxide or the like. On the other hand, the protective layer of an organic material is formed on the recording layer into a thin film of about 1 to 100$\mu$, for example, by dissolving in a solvent a polyvinyl chloride resin, styrene resin or the like to provide a solution of the resin and by applying the solution by a suitable means such as a spinner, a roll coater, an applicator or the like.

However, when the protective layer of an inorganic material is formed on the recording layer by vacuum deposition or sputtering, cracks tend to form in the recording layer and/or protective layer after a certain period of time. On the contrary, when the protective layer of an organic material is formed in place of the protective layer of an inorganic material, the recording layer may flow during application or during curing steps of the protective layer of the organic material. For this reason, the formation of the protective layer of the organic material is cumbersome, and cracks tend to form after a certain period of time.

SUMMARY OF THE INVENTION

It is an object of the present invention to provide a data recording medium which prevents formation of cracks in a recording layer and/or a protective layer, and which is improved in a manufacturing yield and in the reliability.

In order to achieve this object, there is provided according to the present invention a data recording medium comprising:
 a disc-shaped substrate;
 a radiation-sensitive recording layer formed on one surface of said substrate;
 an oxide layer formed by oxidizing a surface of said recording layer; and
 a protective layer formed on said oxide layer.

DETAILED DESCRIPTION OF THE PREFERRED EMBODIMENTS

The preferred embodiment of the present invention will now be described with reference to the accompanying drawings.

Figure 1:
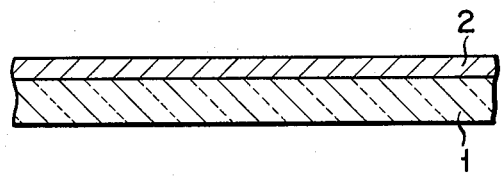
FIGS. 1 and 2 are sectional views of the main part showing an example of a conventional data recording medium.
Figure 2:
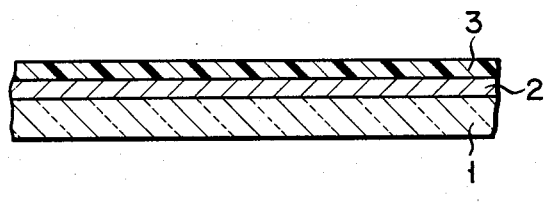
Figure 3:
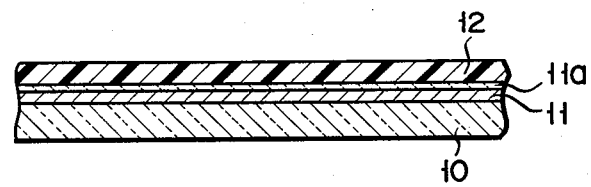
FIG. 3 is a sectional view of the main part showing a data recording medium according to an embodiment of the present invention.

FIG. 3 is a sectional view of the main part of a data recording medium according to an embodiment of the present invention. Referring to FIG. 3, a data recording medium has a substrate 10, a recording layer 11 which is formed on the substrate 10 and on the surface of which is formed an oxide layer 11a, and a protective layer 12 covering the recording layer 11. The substrate 10 is made of glass or a synthetic resin and is of a disc-shape having a thickness of 0.2 to 2 mm and a diameter of 30 cm. In order to record or reproduce data on or from a recording layer 11 to be described later by focusing a laser beam thereon, the glass or synthetic resin as the material of the substrate 10 must transmit light. Examples of the synthetic resin may include a polyolefin such as polyethylene; polyvinyl chloride; a vinyl chloride-acetate copolymer; an ethylene-vinyl acetate copolymer, polycarbonate; polyacrylic acid; polymethacrylic acid; and a lower alkyl ester of polyacrylic acid or polymethacrylic acid. In order to obtain the substrate 21 of excellent transparency and greater mechanical strength, it is preferable to use polyacrylic acid, polymethacrylic acid or a lower alkyl ester thereof.

The recording layer 11 is of an annular shape with the central hole (not shown) of the substrate 10 as the center. The recording layer 11 is a thin film made of a light-reflecting material. The light-reflecting material is required to reflect the laser beam and may be for example Te, Bi, or Al. The thickness of the recording layer 11 is less than 5,000 Å, preferably 200 to 2,000 Å. The method for forming the recording layer 11 on the surface of the substrate 10 may be selected freely only if the recording layer 11 of small thickness can be uniformly formed. The method, therefore, may be a deposition method such as vacuum deposition, sputtering or ion deposition. The dense oxide layer 11a is formed on the surface of the recording layer 11 by oxidizing this surface. The method for oxidizing the surface of the recording layer may include radiation with ultraviolet rays or infrared rays, heating, standing in the ambient atmosphere, or the like. The oxide layer 11a is preferably 20 to 500 Å thick. Among the oxidizing methods mentioned above, radiation with ultraviolet rays or standing in a dry air are preferred since the dense oxide layer is easy to form thereby. If the dense oxide layer is too thin, favorable effects may not be obtained. On the other hand, if the dense oxide layer is too thick, the contrast of the recording bit is difficult to control.

The protective layer 12 is formed so as to cover the oxide layer 11a of the recording layer 11 and to form a concentric ring having the central hole (not shown) of the substrate 10 as a center. The protective layer 12 may therefore be made of an organic material such as polystyrene, an epoxy resin, a polycarbonate resin, a vinyl chloride-acetate copolymer, an ethylenevinyl acetate copolymer, and a silicone resin. The protective layer 12 of an organic material as described above can be formed by preparing a solution of the organic material in an organic solvent such as benzene, toluene, or the like, applying the solution on the surface of the oxide layer 11a of the recording layer 11, and removing the organic solvent. Said protective layer 12 may be formed by using said resin of uncured state without said solvent. The protective layer 23 may alternatively be made of an inorganic material such as $SiO_2$, SiO, $In_2O_3$, $SnO_2$, MgO, ZnO, $ZnO_2$, $Al_2O_3$, $CeO_2$, $TiO_2$, $MgF_2$, $CaF_2$ and $CeF_3$. The protective layer 12 of the inorganic material is formed on the recording layer by vacuum deposition, sputtering or the like.

Figure 4:
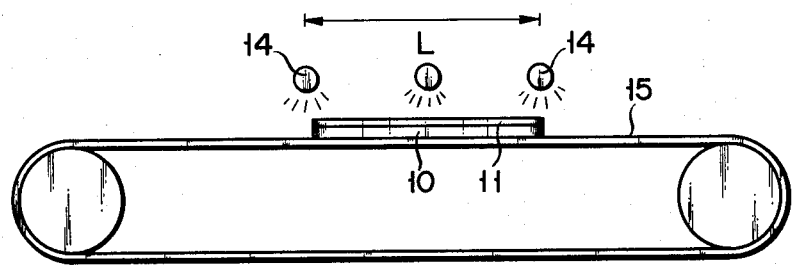
FIG. 4 is a schematic sectional view showing a method for manufacturing a data recording medium according to an embodiment of the present invention.

An embodiment of the manufacturing method of the data recording medium of the construction as described above will now be described with reference to FIG. 4. FIG. 4 is a schematic view showing an embodiment of the method of manufacturing the data recording medium of the present invention. First, the recording layer 11 of Te is formed to a thickness of 500 Å by vacuum deposition on the surface of the substrate 10 of an acrylics. Thereafter, the whole structure is fed to a heating section by a supply belt 15 at a rate of 5 m/min. The heating section has an arranging distance L (50 cm) in which three focusing type ultraviolet lamps 14 of 80 W/cm are arranged. In this manner, the oxide layer 11a of about 100 Å thickness as shown in FIG. 3 is formed on the surface of the recording layer 11. A styrene resin is coated on the surface of the recording layer 11 to a thickness of 20 μm by spinner coating to form the protective layer 12 as shown in FIG. 3. As a result, the recording layer 11 of Te and of 400 Å thickness is formed on the surface of the substrate 10 of the acrylics. The surface layer of the recording layer 11 is oxidized to form the oxide layer 11a ($TeO_x$) of 100 A thickness. The protective layer 12 of a styrene resin is formed thereover. Therefore, since the oxide layer 11a is formed on the surface of the recording layer 11, the recording layer 11 will have good mechanical strength. The formation of the microcracks in the recording layer 11 during formation of the protective layer 12 may therefore be prevented.

Although the present invention has been described with reference to a particular embodiment thereof, the present invention is by no means limited to this. It is to be understood that various other modifications and changes may be made within the spirit and scope of the present invention.

In summary, according to the present invention, an oxide layer is formed on the surface of a recording layer, so that the recording layer has better mechanical strength and formation of cracks in the recording layer during the formation of the protective layer is prevented. Accordingly, the data recording medium provides advantages such as improvements in the manufacturing yield and the reliability.

What we claim is:

1. A data recording medium comprising:
   a disc-shaped substrate;
   a radiation-sensitive recording layer formed on one surface of said substrate;
   an oxide layer formed by oxidizing a surface of said recording layer; and
   a protective layer formed on said oxide layer.

2. A data recording medium according to claim 1, wherein said oxide layer has a thickness of 20 to 500 Å.

3. A data recording medium according to claim 1, wherein said recording layer contains a metal selected from the group consisting of Te, Bi and Al.

4. A data recording medium according to claim 1, wherein said protective layer is made of an organic material selected from the group consisting of an epoxy resin, polystyrene resin, silicone resin, polycarbonate resin, vinyl chloride-acetate copolymer, and ethylenevinyl acetate copolymer.

5. A data recording medium according to claim 1, wherein said protective layer is made of an inorganic material selected from the group consisting of $SiO_2$, SiO, $In_2O_3$, $SnO_2$, MgO, ZnO, $ZnO_2$, $Al_2O_3$, $CeO_2$, $TiO_2$, $MgF_2$, $CaF_2$ and $CeF_3$.

* * * * *